United States Patent
Selbertinger et al.

(10) Patent No.: US 10,471,653 B2
(45) Date of Patent: *Nov. 12, 2019

(54) METHOD FOR PRODUCING SILICONE ELASTOMER PARTS

(71) Applicant: Wacker Chemie AG, Munich (DE)

(72) Inventors: Ernst Selbertinger, Burghausen (DE);
Frank Achenbach, Simbach (DE);
Bernd Pachaly, Mehring (DE)

(73) Assignee: WACKER CHEMIE AG, Munich (DE)

( * ) Notice: Subject to any disclaimer, the term of this patent is extended or adjusted under 35 U.S.C. 154(b) by 61 days.

This patent is subject to a terminal disclaimer.

(21) Appl. No.: 15/524,834

(22) PCT Filed: Oct. 30, 2015

(86) PCT No.: PCT/EP2015/075329
§ 371 (c)(1),
(2) Date: May 5, 2017

(87) PCT Pub. No.: WO2016/071241
PCT Pub. Date: May 12, 2016

(65) Prior Publication Data
US 2017/0312981 A1 Nov. 2, 2017

(30) Foreign Application Priority Data
Nov. 6, 2014 (DE) .......... 10 2014 222 685

(51) Int. Cl.
| | | |
|---|---|---|
| *B29C 64/112* | (2017.01) | |
| *C08L 83/04* | (2006.01) | |
| *B33Y 70/00* | (2015.01) | |
| *B33Y 10/00* | (2015.01) | |
| *B29C 64/264* | (2017.01) | |
| *C08G 77/12* | (2006.01) | |
| *C08G 77/20* | (2006.01) | |
| *B29K 83/00* | (2006.01) | |
| *B29K 105/16* | (2006.01) | |

(52) U.S. Cl.
CPC .......... *B29C 64/112* (2017.08); *B29C 64/264* (2017.08); *B33Y 10/00* (2014.12); *B33Y 70/00* (2014.12); *C08L 83/04* (2013.01); *B29K 2083/005* (2013.01); *B29K 2105/16* (2013.01); *C08G 77/12* (2013.01); *C08G 77/20* (2013.01)

(58) Field of Classification Search
CPC ...... B29C 64/112; B29C 64/264; B33Y 70/00
See application file for complete search history.

(56) References Cited

U.S. PATENT DOCUMENTS

| | | |
|---|---|---|
| 3,884,866 A | 5/1975 | Jeram et al. |
| 5,057,151 A | 10/1991 | Schuster et al. |
| 5,582,876 A | 12/1996 | Langer et al. |
| 6,359,098 B1 | 3/2002 | Fehn et al. |
| 6,641,772 B2 | 11/2003 | Gelbart |
| 6,942,830 B2 | 9/2005 | Muehlhaupt et al. |
| 8,088,878 B2 | 1/2012 | Koellnberger |
| 8,314,200 B2 | 11/2012 | Jandke et al. |
| 8,378,004 B2 | 2/2013 | Angermaier et al. |
| 8,940,851 B2 | 1/2015 | Mueller |
| 9,339,839 B2 | 5/2016 | Fliess et al. |
| 2007/0049652 A1* | 3/2007 | Ito .......... C08F 283/12 522/99 |
| 2011/0196096 A1 | 8/2011 | Angermaier et al. |
| 2014/0079916 A1 | 3/2014 | Grebe et al. |
| 2014/0081192 A1 | 3/2014 | Wenske et al. |
| 2015/0014881 A1* | 1/2015 | Elsey .......... B29C 67/0059 264/219 |

FOREIGN PATENT DOCUMENTS

| | | |
|---|---|---|
| CN | 1450953 A | 10/2003 |
| CN | 103660298 A | 3/2014 |
| DE | 38 39 900 A1 | 5/1990 |
| DE | 100 24 618 A1 | 4/2001 |
| DE | 199 50 284 A1 | 4/2001 |
| DE | 101 11 422 A1 | 9/2002 |
| DE | 101 52 878 A1 | 5/2003 |
| DE | 10 2008 000 156 A1 | 7/2009 |
| DE | 10 2008 043 316 A1 | 5/2010 |
| DE | 10 2009 002 231 A1 | 10/2010 |
| DE | 10 2009 027 486 A1 | 1/2011 |
| DE | 10 2010 043 149 A1 | 5/2012 |
| DE | 10 2011 012 412 A1 | 8/2012 |
| DE | 10 2011 012 480 A1 | 8/2012 |
| DE | 10 2012 204 494 A1 | 9/2012 |
| DE | 10 2011 108 799 A1 | 1/2013 |
| EP | 0 122 008 A1 | 10/1984 |
| EP | 0 146 307 B1 | 6/1985 |
| EP | 0 358 452 B1 | 3/1990 |
| EP | 0 398 701 B1 | 11/1990 |
| EP | 0 561 893 B1 | 9/1993 |
| EP | 0 561 919 B1 | 9/1993 |
| EP | 1 050 538 B1 | 11/2000 |
| EP | 1 077 226 A1 | 2/2001 |
| EP | 1 803 728 B1 | 7/2007 |
| EP | 2 676 633 A1 | 12/2013 |
| WO | 93/08506 A1 | 4/1993 |
| WO | 95/25003 A1 | 9/1995 |

(Continued)

OTHER PUBLICATIONS

Andreas Ostendorf et al., "Two-Photon Polymerization: A New Approach to Micromachining." Photonics Spectra 2008, 10, 9 pages.

*Primary Examiner* — Edward J Cain (74) *Attorney, Agent, or Firm* — Brooks Kushman P.C.

(57) ABSTRACT

Silicon elastomer articles are prepared by a 3-D printing process by depositing droplets of high viscosity curable silicone onto a substrate layer by layer from independently spatially controllable nozzles and irradiation with independently spatially controllable electromagnetic energy.

12 Claims, 4 Drawing Sheets

(56) References Cited

FOREIGN PATENT DOCUMENTS

| WO | 96/30182 A1 | 10/1996 |
| WO | 2009/027133 A2 | 3/2009 |
| WO | 2013/091003 A1 | 6/2013 |

* cited by examiner

METHOD FOR PRODUCING SILICONE ELASTOMER PARTS

CROSS REFERENCE TO RELATED APPLICATIONS

This application is the U.S. National Phase of PCT Appln. No. PCT/EP2015/075329 filed Oct. 30, 2015, which claims priority to German Application No. 10 2014 222 685.6 filed Nov. 6, 2014, the disclosures of which are incorporated in their entirety by reference herein.

BACKGROUND OF THE INVENTION

1. Field of the Invention

The invention relates to a generative process for producing shaped elastomeric bodies from crosslinkable silicone compositions by means of electromagnetic radiation, this process being characterized in that the shaped elastomeric body is built up step by step, by repeated precise placement of small portions of the crosslinkable silicone composition and crosslinking thereof by means of electromagnetic radiation.

2. Description of the Related Art

For the production of shaped elastomeric parts starting from crosslinkable silicone rubber compositions there are numerous processing methods available. Depending on the consistency and mechanism of crosslinking of the silicone rubber composition, shaped parts may be produced, for example, by injection molding, by compression molding, by extrusion, by calendering, casting, etc. The properties of the shaped silicone part formed (hardness, tensile strength, extensibility, color, etc.) are determined substantially by the physical makeup of the crosslinkable silicone rubber composition, and further by the processing conditions such as pressure and temperature. In other words, these processes yield high unit numbers of shaped silicone parts which are typically largely isotropic in terms of the mechanical and optical properties.

The existing processes, however, are increasingly coming to their limits when the requirement is for shaped silicone parts of relatively complex geometry, of different material composition and/or with variable profiles of properties. The production of, for example, injection molds suitable for the particular purpose is becoming increasingly more costly and inconvenient or is fundamentally impossible. Profiles of requirements of this kind exist, for example, in the field of exo- and endoprostheses and especially epitheses (e.g., artificial outer ears, whose softer and harder areas (skin, cartilage) merge continuously into one another). In addition, very complex structures, such as those known from bionics, cannot be realized by means of the conventional processing techniques. The general trend toward individualization and individual adaptation of commodity articles, moreover, entails smaller unit numbers, thereby robbing conventional processes of their efficiency. The same is true of the production of prototypes.

One process for producing shaped parts that is gaining increasingly in importance is that of generative fabrication (Additive Manufacturing; 3D printing processes), which is an umbrella term for numerous different technologies whose common feature is an automated additive buildup of layers of the shaped part (A. Gebhardt, Generative Fertigungsverfahren, Carl Hanser Verlag, Munich 2013). A precondition of all generative production methods is the representation of the geometry and possibly of other properties (color, material composition) of the desired shaped body in the form of a digital 3D data set, which can be understood as a virtual model of the shaped body. This modeling is accomplished preferably by means of diverse 3D CAD construction methods (computer-aided design). The input data for the production of a 3D CAD model may also be 3D measurement data, as resulting, for example, from CT measurements (Computer Tomography) or MRT measurements (Magnetic Resonance Tomography). The 3D CAD data set must subsequently be supplemented by data specific to material, process, and fabricating unit, and this is accomplished by handing over the data set via an interface in a suitable format (e.g., STL, CLI/SLC, PLY, VRML, AMF format) to a piece of additive manufacturing software. From the geometric information, lastly, this software generates virtual individual layers (slices), and account is taken of the optimum orientation of the component in the construction space, support structures, etc. The complete data set then allows direct driving of the machine (3D printer) used for the generative fabrication.

The software sequence is as follows:
1. Construction of the component in CAD format
2. Export into the STL data format
3. Division of the 3D model into slices parallel to the printing plane and generation of the G-code
4. Transfer of the G-code to the printer control Generative fabrication processes are available for numerous materials and also combinations thereof (e.g., metals, plastics, ceramics, glasses).

One of these technologies is the stereolithography process, described for example in WO 93/08506 A1 and WO 95/25003 A1, in which a radiation-curing plastics composition of low viscosity is applied in a thin layer to a support plate and is cured locally by computer-controlled irradiation of selected regions of the x, y plane (laser or radiation source with mask). After the next thin layer has been applied (typically by gauged lowering/immersion of the already crosslinked layer located on the support plate into a bath consisting of the noncrosslinked liquid plastics composition), this operation is repeated, the shaped body being built up layer by layer in the z-direction. Application of each next noncrosslinked layer with defined layer thickness can be accomplished, for example, by a doctor blade or a slot die. Lastly, the noncrosslinked plastics composition is removed from the resulting shaped body, optionally with assistance of a solvent and ultrasound. A process of this kind is also described in DE 199 50 284 A1, where one of the possibilities for the composition which cures by radical polymerization in visible light is an initiator-containing silicone resin composition, more particularly of the Ormocer® type. The silicone resin composition may comprise fillers and accordingly may also be of pastelike consistency. In that case, the individual layers can be applied by a roller system. A disadvantage is that the application of high-viscosity compositions by means of a roller system requires sheetlike substructures of high stability, a requirement which is generally not met by flexibly resilient substructures. WO 96/30182 as well describes the production of a shaped body in the stereolithography process starting from an epoxy-functional silicone composition which comprises a cationic photoinitiator and which is cured using a UV laser. The epoxy-functional monomers and oligomers used yield hard shaped bodies having a glass transition temperature of >250° C. Disadvantages would have to include not only the toxicological objectionability of cationic photoinitiators (onium salts) and photosensitizers (fused aromatics) but also the high density of epoxy group functions required in the silicone. Furthermore, the stereolithography process requires plastics compositions of relatively low viscosity (typically <0.3 Pa·s) in order to ensure effective leveling of the newly applied layers, which are a few hundred μm in thickness. The production of flexibly resilient shaped bodies with good mechanical strength, however, requires that long-chain silicone polymers be used in combination with reinforcing fillers, and this automatically results in silicone rubber compositions of comparatively high viscosity (>100 Pa·s). It is desirable, moreover, to use the physiologically unobjectionable addition-crosslinkable silicone rubber compositions for producing the shaped bodies; these compositions crosslink by platinum-catalyzed addition reaction of siloxane crosslinkers containing SiH groups onto vinyl-functional polysiloxanes (hydrosilylation). The combination of the thermally initiated or UV-light-initiated addition crosslinking with the above-described stereolithography process is a problem, since even when the irradiated and thus activated region is strongly focused (by means of an IR or UV laser), the immediate vicinity as well is crosslinked at least incipiently through diffusion of the activated platinum catalyst, through thermal conductivity, and through the strong exothermic nature of the addition-crosslinking process; this at least incipient crosslinking results in the entire silicone rubber composition in the bath being unusable, and also in the shaped body having a sticky, poorly delimited surface.

The above problem also cannot be solved by the process, disclosed in DE 100 24 618 A1, for producing three-dimensional articles from heat-sensitive compositions (those mentioned include silicone rubber resins), which is distinguished by the fact that the shaped body is formed by focused guidance of a light beam (focal spot of an IR laser) in three dimensions within the bath volume of a thermally crosslinkable liquid plastics composition, which must necessarily be transparent. Furthermore, the production of a flexibly resilient shaped body is tied to the presence of appropriate support structures, which cannot be constructed simultaneously in this process. Refinements of this process are described in DE 101 11 422 A1 and DE 101 52 878 B4. DE 101 52 878 B4 describes the production of three-dimensional shaped bodies or structures on surfaces by site-selective solidification of an organo-functional silicone resin within a bath of this material by means of two-photon or multiple-photon polymerization (A. Ostendorf, B. N. Chichov, Photonics Spectra 2006, 10, 72-80). The liquid silicone resins used contain organofunctional groups which permit (radical) two-photon or multiple-photon polymerization (e.g., methacrylic groups), with the high radiation intensity required for multiple-photon operations being generated by focusing of an ultrashort-time-pulsed (N)IR laser beam (optionally after beam widening beforehand). The advantage is that the radiation intensity required for the multiple-photon operation is achieved only within the focus area, while the material in the surroundings undergoes only one-photon excitation, which is unable to initiate the polymerization step, in other words the curing. The process is especially suitable for producing precisely shaped, substrate-supported or self-supporting structures preferably in the μm range, consisting of highly crosslinked, hard (OR-MOCER®-like) organo-silicates, but not flexibly resilient silicone elastomers.

Overall it may be stated that the production of shaped rubber-elastic silicone bodies by the stereolithography-like processes above is unsuitable on account of the inadequacies recited. Something the above-recited generative processes have in common is that the noncrosslinked material forming the shaped body is not applied selectively on regions of a working surface (or is present as a bath), but instead is also present in regions which do not become part of the shaped body. Only through the subsequent selective curing does a part of the composition applied or present become a constituent of the shaped part. One embodiment of the stereolithography process that differs from this involves the crosslinkable composition being placed selectively only at those locations which do become part of the shaped body. The subsequent crosslinking may then take place selectively (by means of a laser, for example) or nonselectively (by areal irradiation with a lamp, for example).

The site-selective application of the crosslinkable composition may be accomplished by means of extrusion, for example. DE 10 2012 204 494 A1 describes the production of a primary silicone contact material for wound management, such production being able to take place by the 3D printing process among others. The primary contact material possesses the form of a lattice or mesh, which is formed, in analogy to filament 3D printing, by meanderlike continuous extrusion of silicone rubber compositions through a nozzle and subsequent crosslinking.

The site-selective application of the crosslinkable composition is accomplished preferably by what are called ballistic processes, a feature of which is that the crosslinkable material is applied with the aid of a printing head in the form of individual droplets, discontinuously, at the desired location of the work plane (Jetting). DE 10 2011 012 412 A1 and DE 10 2011 012 480 A1 describe an apparatus and a process for the step-by-step production of 3D structures with a printing head arrangement comprising at least two, preferably 50 to 200 printing head nozzles, allowing the site-selective application where appropriate of a plurality of photocrosslinkable materials with different photosensitivities, with the photocrosslinkable materials being subsequently subjected to site-selective solidification through electromagnetic radiation, more particularly through two-photon or multiple-photon processes in the focal region of a laser. The application of the photocrosslinkable materials by means of inkjet printing imposes specific requirements on the viscosity of the photocrosslinkable materials. Thus the photocrosslinkable materials feature a viscosity of less than 200 mPa·s, more preferably less than 80 mPa·s, and most preferably less than 40 mPa·s. In order to achieve sufficient crosslinking of the applied material by means of two-photon or multiple-photon polymerization, photoinitiators tailored to the laser wavelength are required, as is a polymeric crosslinker component containing photocrosslinkable groups, where the photocrosslinkable groups belong to the class of the acrylates, methacrylates, acrylamides, methylacrylamides, urethane acrylates, urethane methacrylates, urea acrylates, and urea methacrylates. The process described, however, is not suitable for producing shaped parts consisting of silicone elastomers. First of all, the solubility of the photoinitiators, photosensitizers, coinitiators, etc. that are used is poor in the (nonpolar) silicone compositions, and this leads to instances of hazing, microphase separation, and inhomogeneities. The radical curing of silicones functionalized with the abovementioned photocrosslinkable groups suffers, as is known, from the problem of inhibition caused by oxygen, thereby considerably reducing the crosslinking rate and resulting in sticky surfaces. If this effect is counteracted by raising the density of, for example, acrylate functional groups, the resulting vulcanizates are brittle and inelastic. Lastly, the extremely high local photon density that is required for multiple-photon polymerization (owing in particular to the low density of photopolymerizable group functions), and which is generated by means of pulsed femtosecond lasers, sets off decomposition reactions (carbonization) within the silicone, leading to unacceptable discolorations and damage to material.

It can be observed overall that none of the apparatuses and processes conforming to the prior art are suitable for efficient and effective production of high-quality shaped parts made of silicone elastomers in a generative fabrication process.

SUMMARY OF THE INVENTION

The object was therefore to provide a generative fabrication process and an apparatus suitable therefor, for the efficient production of individualized, high-quality, shaped silicone elastomer parts, without the disadvantages identified above.

These and other objects are surprisingly achieved by the process of the invention and the apparatus of the invention, where a high viscosity (>10 Pa·s) thermally or light-curable silicone is applied by an independently spatially controllable jetting apparatus, and is crosslinked or incipiently crosslinked by an independently spatially controllable source of electromagnetic radiation, and the part being formed is displaced in the z-direction and the process repeated until formation of the part is completed.

DETAILED DESCRIPTION OF THE DRAWINGS

DESCRIPTION OF THE PREFERRED EMBODIMENTS

The process for the layer-by-layer production of shaped silicone elastomer parts (8), in greater detail, involves the steps as follows:

1) An independently spatially controllable jetting apparatus (1) is used for dropwise application (6) in the x, y work plane, of at least one silicone rubber composition curable by electromagnetic radiation, via at least one printing head (5), to an independently spatially controllable baseplate (3) or to a shaped body affixed thereto.
2) At least one independently spatially controllable source of electromagnetic radiation (2) is used for crosslinking or incipient crosslinking (7) of the drop or drops (6), to form a layer of the cured or partially cured shaped silicone elastomer part.
3) The jetting apparatus (1) and/or the shaped silicone elastomer part from step 2 are displaced relative to each other in the z-direction only far enough that the next drop layer (6) can be applied in the x, y work plane.
4) Steps 1 to 3 are repeated until construction of the shaped silicone elastomer part (8) is complete, characterized in that a) the silicone rubber composition used is addition-crosslinking and is crosslinked in step 2 by means of electromagnetic radiation (7) with induction either thermally and/or by UV or UV-VIS light,
b) the silicone rubber composition has a viscosity of at least 10 Pa·s, measured at 25° C. and a shear rate of 0.5 s$^{-1}$ by the method as disclosed in the description, c) the drops (6) in the x, y work plane are exposed to the electromagnetic radiation (7) site-selectively or areally, in pulses or continuously, and with constant or variable intensity, and
d) steps 1) and 2) and 3) take place independently of one another or coupled to one another, simultaneously or in succession in any order.

The viscosity of the silicone rubber compositions is determined by the measurement method described below. In the examples as well, the viscosities were determined analogously. An MCR 302 rheometer from Anton Paar of Graz, Austria, was used and measurement took place in accordance with DIN EN ISO 3219: 1994 and DIN 53019, using a cone/plate system (CP50-2 cone) with an opening angle of 2°. The instrument was calibrated with standard oil 10000 from Physikalisch-Technische Bundesanstalt, Braunschweig, Germany. The measuring temperature is 25.00° C.±0.05° C., the measuring time 3 min. The viscosity figure reported represents the arithmetic mean of three independently conducted individual measurements. The measurement uncertainty for the dynamic viscosity is 1.5%. The shear rate gradient was selected as a function of the viscosity and is identified separately for each viscosity figure reported (see also data in table 2). The shear rate gradient (or shear rate) used for the viscosity measurements was customarily 0.5 s$^{-1}$ in each case, and also, according to the silicone rubber composition employed, 10, 25 or 100 s-1 (see also data in table 2).

Shear-thinning behavior on the part of the silicone rubber compositions, as exhibited by silicone rubber compositions containing filler, is particularly advantageous for the microdroplet metering used in the process of the invention. As a result of the high shear rate occurring in the metering valve during the jetting metering procedure, the viscosity of such filler-containing silicone rubber compositions is greatly lowered and so permits the jetting metering of very fine microdroplets (6). After the microdrop (6) has been deposited on the substrate (3), there is a sudden reduction in its shear rate, and so its viscosity climbs again immediately. As a consequence of this, the deposited drop (6) immediately becomes of high viscosity again and permits the shape-precise construction of three-dimensional structures.

The silicone rubber compositions used in the process of the invention preferably exhibit a viscosity at 25° C. and a shear rate of 0.5 s$^{-1}$ of at least 40 Pa·s, more preferably at least 100 Pa·s, and most preferably at least 200 Pa·s.

The jetting apparatus (1) and the source of electromagnetic radiation (2), and also the baseplate (3), are spatially independently controllable. This means that the apparatus in question can be moved site-selectively in all three directions in space, x, y, and z, in other words three-dimensionally.

In a further embodiment, the drop (6) is deposited and is crosslinked or incipiently crosslinked (7) in operations that are coupled to one another or even synchronous.

The process of the invention is carried out on a fabricating unit which comprises at least the following components:
  a spatially independently controllable jetting apparatus (1) comprising at least one reservoir (4) and at least one jetting nozzle (5),
  a spatially independently controllable source of electromagnetic radiation (2),
  a spatially independently controllable baseplate (3).

Figure 1:
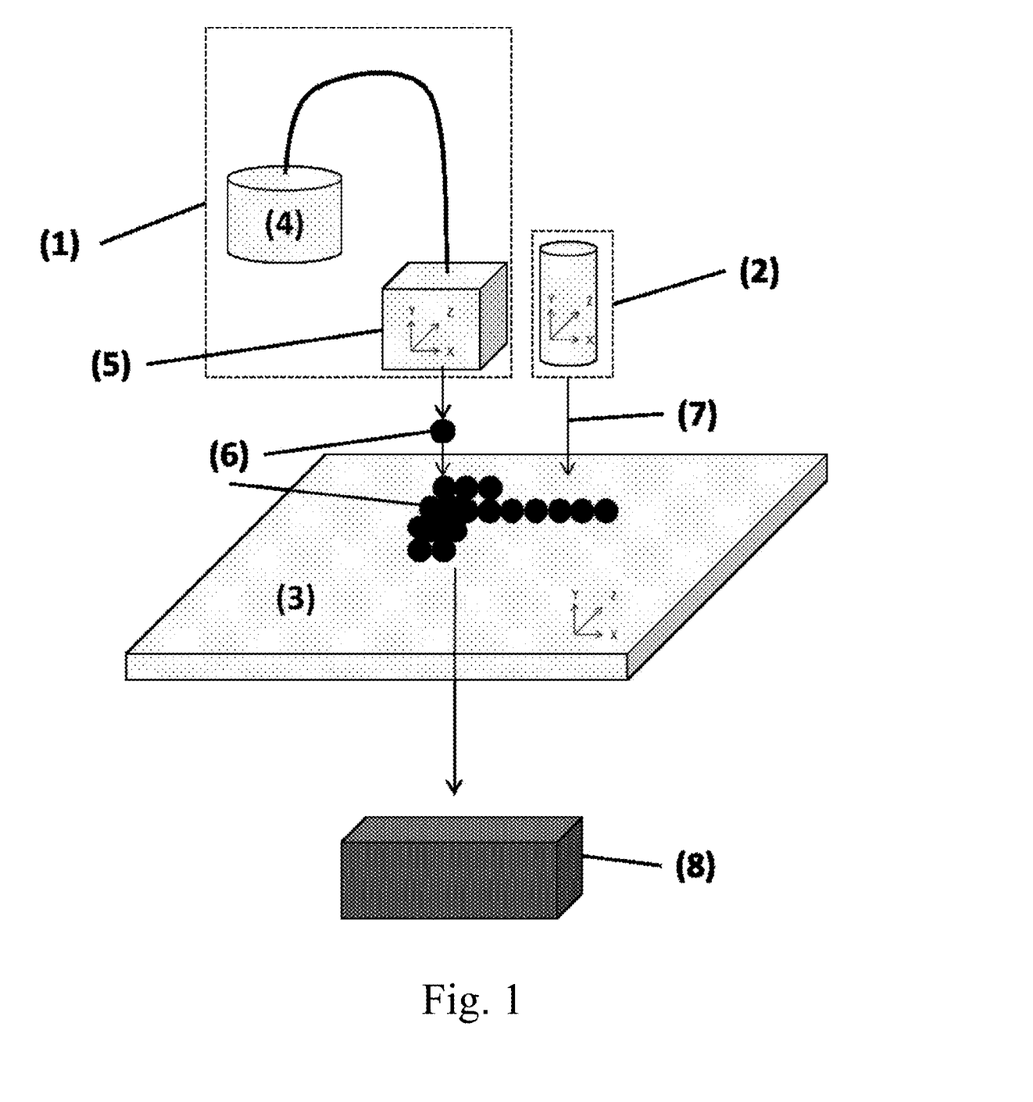
FIG. 1 illustrates one embodiment of the invention on schematic form.

FIG. 1 shows a diagrammatic example of a generative fabricating unit which is used in the process of the invention for producing silicone elastomer parts (8). The silicone rubber composition crosslinkable by electromagnetic radiation is located in the reservoir (4) of a jetting apparatus (1), this reservoir being subject to pressure and being connected via a metering line to a metering nozzle (5). Upstream or downstream of the reservoir (4) there may be devices which make it possible for multicomponent silicone rubber compositions to be homogeneously mixed and/or for dissolved gases to be removed by evacuation. A plurality of jetting apparatuses (1) operating independently of one another may be present, in order to construct the shaped part (8) from different silicone rubber compositions, to permit composite parts made from silicone elastomers and other plastics, or, in the case of more complex structures, to realize support structures that may be necessary, composed of appropriate materials.

The individual metering nozzles (5) can be positioned accurately in x-, y-, and z-directions in order to permit precisely targeted deposition of the silicone rubber drops (6) on the baseplate (3), which preferably is heatable and likewise may be positioned independently in x-, y-, and z-directions, or, in the subsequent course of formation of shaped parts, on the silicone rubber composition which has already been placed and which optionally has already been crosslinked.

The metering nozzles (5) are preferably positioned using traversal units with high repetition accuracy. The traversal unit used for positioning the metering nozzles (5) has an accuracy of at least ±100 μm, preferably of at least ±25 μm, in each case in all three directions in space. The maximum speed of the traversal units used is a critical determinant of the production time of the shaped part (8), and ought therefore to be at least 0.01 m/s, preferably at least 0.1 m/s, more preferably at least 0.3 m/s, and most preferably at least 0.4 m/s.

Preference is given to metering nozzles (5) which allow the jetting of fluid media of moderate to high viscosity. Through the process of the invention, therefore, shaped silicone elastomer parts (8) can be built up dropwise in x-, y-, and z-directions via printing heads (5), with silicone rubber compositions with a viscosity of greater than 10 Pa·s, preferably at least 40 Pa·s, more preferably at least 100 Pa·s, and most preferably at least 200 Pa·s (in each case at 25° C. and a shear rate of 0.5 s$^{-1}$). Suitable heads include, in particular, (thermal) bubble-jet and piezoelectric printing heads (5), with piezoelectric printing heads (5) being particularly preferred. The latter permit the jetting both of low-viscosity materials, in which case drop volumes for drops (6) of a few picoliters (pL) (2 pL correspond to a drop diameter of about 0.035 μm) can be realized, and also of medium- and high-viscosity materials such as the silicone rubber compositions, in which case piezoelectric printing heads (5) with a nozzle diameter of between 50 and 500 μm are preferred and drop volumes in the nanoliter range (1 to 100 nL) can be generated. With low-viscosity compositions (<100 mPa·s), these printing heads (5) are able to deposit droplets (6) with very high metering frequency (about 1-30 kHz), whereas with higher-viscosity compositions (>100 Pa·s), depending on the rheological properties (shear-thinning behavior), metering frequencies of up to about 500 Hz can be obtained. Suitable nozzles are described for example in DE 10 2011 108 799 A1.

In order to prevent or eliminate fouling of the metering nozzles (5), an automatic metering-nozzle cleaning station may be added to the unit of the invention as shown in FIG. 1.

The jetting apparatuses (1), moreover, may possess temperature-setting units, in order to condition the rheological characteristics of the silicone rubber compositions and/or to utilize the reduction in viscosity through elevated temperatures for jetting.

In another embodiment, as an additional step, the shaped part (8) produced is temperature-conditioned at temperatures of >100° C., preferably at 150° C.

If the intention is to produce a shaped part (8) in which gas inclusions are to be avoided, then the silicone rubber compositions are preferably degassed before being used, by the application of a reduced pressure at the reservoir (4) for example.

The entire unit outlined in FIG. 1 may also be accommodated in a vacuum chamber or inert gas chamber, in order for example to rule out UV-C radiation losses as a result of oxygen, or to prevent air inclusions in the shaped part (8).

Crosslinking (7) of the drops (6), for drops (6) of deposited silicone rubber composition, takes place by means of one or more electromagnetic radiation sources (2) (e.g., IR lasers, IR lamps, UV-VIS lasers, UV lamps, LED), which likewise possess the possibility for traversal in x-, y-, and z-directions. The radiation sources (2) may possess deflection mirrors, focusing units, beam-widening systems, scanners, shutters, etc. Deposition and crosslinking must be harmonized with one another. The process of the invention encompasses all possibilities conceivable in this respect. It may, for example, be necessary first to cover an areal region of the x, y work plane with silicone rubber drops (6) and to wait for leveling (coalescence) to take place, before then areally irradiating and crosslinking this region. It may also make sense, for contouring, for the applied area first to be solidified only in the edge region, and subsequently for the inside region to be incipiently crosslinked by means of suitable shading. It may also be necessary for individual drops (6) to be crosslinked or incipiently crosslinked immediately after they have been placed, in order to prevent running. It may be judicious for the entire working region to be irradiated permanently during shaped-part formation, in order to achieve complete crosslinking, or for it to be exposed to the radiation only briefly, in order deliberately to bring about a state of incomplete crosslinking (green strength), which may in certain circumstances go hand in hand with better adhesion of the individual layers to one another. In general, therefore, it will be necessary for the parameters which determine deposition and crosslinking to be tailored to one another as a function of the crosslinking system, the rheological characteristics, and the adhesion properties of the silicone rubber compositions and also, where appropriate, of the other materials used.

The silicone rubber compositions that are used with preference in the process of the invention crosslink by hydrosilylation reaction (addition reaction) between Si-bonded hydrogen atoms and aliphatically unsaturated groups which are located preferably on the silicone polymer. Silicone rubber compositions of this kind are well known to the skilled person, for example, as RTV-2 (2-part Room Temperature Vulcanizing) or LSR (Liquid Silicone Rubber), and are described for example in U.S. Pat. No. 3,884,866. Since the preferably platinum-catalyzed addition reaction proceeds spontaneously even at room temperature, these silicone rubber compositions are supplied typically in the form of two components, with one component containing the SiH-functional crosslinker and the other component containing the platinum catalyst. By means of inhibitory additives, or through the use of specific platinum catalysts which are largely inert at room temperature but can be activated thermally, however, it is also possible to formulate one-component silicone rubber compositions, as described in EP 1 077 226 A1, for example.

In the process of the invention, addition-crosslinkable silicone rubber compositions can be activated thermally by IR radiation, by means of an (N)IR laser or an infrared lamp, for example.

In particular there are platinum catalysts available which in the absence of light, at room temperature, are largely inert, but can be activated by UV/VIS radiation, thereby enabling rapid addition crosslinking at room temperature.

The silicone rubber compositions which are particularly preferred in the process of the invention crosslink by UV-induced or UV-VIS-induced addition reaction. Relative to thermal crosslinking, the UV- or UV-VIS-induced crosslinking has numerous advantages. First, intensity, exposure time, and exposure location to the UV or UV-VIS radiation can be precisely dimensioned, while the heating of the dropwise-deposited silicone rubber composition (and also its subsequent cooling) is always retarded, as a result of the relatively low thermal conductivity. In view of the intrinsically very high thermal expansion coefficient of the silicones, the temperature gradients that are present inevitably on thermal crosslinking lead to mechanical stresses, which adversely affect the dimensional integrity of the shaped part formed, something which in extreme cases can result in unacceptable distortions in shape. A further advantage of the UV/VIS-induced addition crosslinking is evident in the production of multicomponent shaped parts, such as hard/soft composites, for example, which as well as the silicone elastomer comprise a thermoplastic, whose thermally induced warping is prevented.

UV/VIS-induced addition-crosslinking silicone rubber compositions are described for example in DE 10 2008 000 156 A1, DE 10 2008 043 316 A1, DE 10 2009 002 231 A1, DE 10 2009 027 486 A1, DE 10 2010 043 149 A1 and WO 2009/027133 A2. Crosslinking comes about through UV/VIS-induced activation of a photosensitive hydrosilylation catalyst, with complexes of platinum being preferred. In the technical literature there are numerous photosensitive platinum catalysts described which are largely inert in the absence of light and which can be converted into room-temperature-active platinum catalysts by irradiation with light having a wavelength of 250-500 nm. Examples thereof are (η-diolefin) (σ-aryl)-platinum complexes (EP 0 122 008 A1; EP 0 561 919 B1), Pt (II) -β-diketonate complexes (EP 0 398 701 B1), and ($\eta^5$-cyclopentadienyl) tri (σ-alkyl) platinum( IV) complexes (EP 0 146 307 B1, EP 0 358 452 B1, EP 0 561 893 B1). Particularly preferred are MeCpPtMe$_3$ and also the complexes deriving therefrom by substitution of the groups located on the platinum, as described for example in EP 1 050 538 B1 and EP 1 803 728 B1.

The compositions which crosslink under induction by UV or UV-VIS may be formulated as one-component or multicomponent systems.

The rate of the UV/VIS-induced addition crosslinking is dependent on numerous factors, particularly on the nature and concentration of the platinum catalyst, on the intensity, wavelength, and exposure time of the UV/VIS radiation, the transparency, reflectivity, layer thickness, and composition of the silicone rubber composition, and the temperature.

The platinum catalyst preferably ought to be used in a catalytically sufficient amount, to allow sufficiently rapid crosslinking at room temperature. Typically 0.1 to 500 ppm by weight of the catalyst are used, based on the amount of the Pt metal, relative to the silicone rubber composition as a whole; preferably 0.5-200 ppm by weight, more preferably 1-50 ppm by weight.

The silicone rubber composition which undergoes addition crosslinking under UV/VIS induction is cured using light of wavelength 240-500 nm, preferably 250-400 nm, more preferably 250 to 350 nm. In order to achieve rapid crosslinking, by which is meant a crosslinking time at room temperature of less than 20 min, preferably less than 10 min, more preferably less than 1 min, it is advisable to use a UV/VIS radiation source having an output of between 10 mW/cm$^2$ and 20,000 mW/cm$^2$, preferably between 30 mW/cm$^2$ and 15,000 mW/cm$^2$, and also a radiation dose of between 150 mJ/cm$^2$ and 20,000 mJ/cm$^2$, preferably between 500 mJ/cm$^2$ and 10,000 mJ/cm$^2$. Within these output and dose values, area-specific irradiation times can be realized of between 2000 s/cm$^2$ at most and 8 ms/cm$^2$ at least.

A further subject of the present invention are shaped silicone elastomer parts (8) produced by the process of the invention.

For a fabricating unit of the invention in accordance with FIG. 1, commercially obtainable individual components were used, and were then modified and harmonized with one another. For the examples of the process of the invention, described below, the generative fabricating unit used was a NEO 3D printer from German RepRap GmbH, Germany, hereinafter called NEO printer, which for the trials was converted and adapted. The thermoplastic filament metering unit originally mounted in the NEO printer was replaced by a jetting nozzle from Vermes Microdispensing GmbH, Otterfing, Germany, hereinafter VERMES jetting nozzle, in order to allow the dropwise deposition on the work plate of silicone rubber compositions ranging from those of high viscosity to those with a sag-resistant pastelike nature.

Because the NEO printer was not equipped as standard for the installation of jetting nozzles, it required modification.

The VERMES jetting nozzle was integrated into the printer control such that the start-stop signal (trigger signal) of the VERMES jetting nozzle was actuated by the G-code control of the NEO printer. For this purpose a specific signal was stored in the G-code control. The G-code control of the computer therefore switched only the VERMES jetting nozzle on and off (start and stop of metering).

For signal transmission of the start-stop signal, the heating cable of the originally installed filament heating nozzle of the NEO printer was parted and connected to the VERMES jetting nozzle.

The other metering parameters (metering frequency, rising, falling, etc.) of the VERMES jetting nozzle were set by means of the MDC 3200+ microdispensing control unit.

The NEO printer was controlled by means of a computer. The software control and control-signal connection of the NEO printer (software: "Repitier-Host") were modified to allow control not only of the movement of the VERMES jetting nozzle in the three directions in space, but also the drop deposition signal. The travel speed of the modified NEO printer that is set for the trials is 0.01 m/s.

Metering system: The metering system employed for the silicone rubber compositions used was the MDV 3200 A microdispensing metering system from Vermes Microdispensing GmbH, Otterfing, Germany, hereinafter called VERMES metering system, consisting of a complete system with the following components: a) MDV 3200 A—nozzle unit with a connection for Luer lock cartridges, subjected on the upper cartridge side to 3-8 bar compressed air (hose with adapter), b) Vermes auxiliary nozzle heating system MDH- 230tfl left, c) MDC 3200+ microdispensing control unit, connected in turn to the PC control and also, via movable cables, to the nozzle, allowed the setting of the jetting metering parameters (rising, falling, open time, needle lift, delay, no pulse, heater, nozzle, distance, voxel diameter, air admission pressure at the cartridge). VERMES jetting nozzles with diameters of 50, 100, 150, and 200 μm are available. Accordingly it was possible to achieve point-precise placement of ultrafine silicone rubber droplets in the nanoliter range at any desired x, y, z-position of the base-plate. Unless otherwise indicated, the standard nozzle insert installed in the Vermes valve was a 200 μm nozzle (nozzle insert N11-200).

Reservoir vessels used for the silicone rubber composition were vertical 30 ml Luer lock cartridges which were screwed onto the dispensing nozzle so as to preclude liquid leakage, and which were subjected to compressed air.

The modified NEO printer and the VERMES metering system were controlled using a PC and "Repitier-Host" open-source software.

Radiation Sources:

Hönle Bluepoint

For the UV-induced addition crosslinking of the silicone rubber compositions, a "Bluepoint 4" UV emitter from Dr. Hönle AG, Gräfeling, Munich, Germany, hereinafter BLUE-POINT irradiation system, was used. The BLUEPOINT irradiation system consists of an operating unit and an associated flexible optical waveguide adjusted in such a way that the emergent UV-A beam was focused onto the freshly deposited drop layer of the component. The beam exit was adjusted via the specimens to be irradiated in such a way that the distance between beam exit and component/specimen was 10 mm.

When set at 80% of maximum intensity, the BLUEPOINT irradiation system, which is based on a 150 W high-pressure mercury lamp, permits a UV-A intensity of about 13,200 mW/cm$^2$ and possesses a timer setting range of 0.1-999.9 sec.

The BLUEPOINT irradiation system was calibrated with an Omnicure R-200 radiometer. With a setting of 80% of the maximum irradiation output on the BLUEPOINT irradiation system, an irradiation output of 13,200 mW/cm$^2$ was ascertained.

UV Chamber with Osram UV Lamp

For off-line UV irradiation of components, a UV irradiation chamber was used which had a reflective internal finish and the following external dimensions:

| | |
|---|---|
| Length | 50 cm |
| Height | 19 cm |
| Width | 33 cm |

The distance between the fluorescent UV lamp and the substrate was 16 cm.

Radiation source: UV lamp with 36 watts electrical output,

Osram Puritec HNS L 36 W 2G11,

Osram GmbH, Augsburg, Germany.

IR Radiation Source

For the IR-induced (thermal) crosslinking, an IR-Spot short wave infrared module from OPTRON GmbH, Garbsen/Hannover, Germany was used (power consumption 150 W). The IR-Spot operates in the short wave IR spectrum with the advantage of a high depth of penetration by radiant energy. At a focal length of 50 mm, a focal spot diameter of 10 mm is generated at the focus. The IR-Spot possesses an output adjuster which allows online output adjustment in the printing operation.

EXAMPLES

The examples which follow serve to illustrate the invention without limiting it. For all of the examples the converted fabricating unit of the invention as described above was used.

Conditioning of the silicone rubber compositions: All of the silicone rubber compositions used were devolatilized before processing, by storage of 100 g of the composition in an open PE jar in a desiccator for 3 h at a reduced pressure of 10 mbar and at room temperature. The composition was then dispensed in an air-free operation into a 30 ml cartridge with bayonet closure, and sealed with an appropriately sized ejector piston (made of plastic). The Luer lock cartridge was then screwed into the vertical cartridge holder of the Vermes metering valve in a manner that prevented escape of liquid, with the Luer lock screw thread downwards, and compressed air at 3-8 bar was applied to the upper side of the cartridge by the pressure piston; the ejector piston located in the cartridge prevents the compressed air from entering into the previously evacuated silicone rubber composition.

All UV-sensitive silicone compositions were produced under yellow light (excluding light below 700 nm), devolatilized in a similar way, and dispensed into light-impervious Semco cartridges.

The viscosity of the silicone rubber compositions used in the examples is evident from table 2.

Raw Materials and Silicone Rubber Compositions Used:

R1: Vinyl-functional MQ silicone resin powder consisting of M, $M^{vinyl}$, and Q units in an M: $M^{vinyl}$: Q ratio of 0.72: 0.09: 1, having a molecular weight Mw=5300 g/mol and Mn=2400 g/mol and a vinyl content of 70 mmol of vinyl per 100 g of silicone resin.

R2: Vinyldimethylsiloxy-terminal polydimethylsiloxane having a viscosity of 200 mPa·s, available from ABCR GmbH, Karlsruhe, Germany under the product name "Poly (dimethylsiloxane), vinyldimethylsiloxy terminated; viscosity 200 cSt.", order No. AB109357, CAS No. [68083-19-2].

R3: Vinyldimethylsiloxy-terminal polydimethylsiloxane having a viscosity of 1000 mPa·s, available from ABCR GmbH, Karlsruhe, Germany under the product name "Poly (dimethylsiloxane), vinyldimethylsiloxy terminated; viscosity 1000 cSt.", order No. AB109358, CAS No. [68083-19-2].

R4: Vinyldimethylsiloxy-terminal polydimethylsiloxane having a viscosity of 20 000 mPa·s, available from ABCR GmbH, Karlsruhe, Germany under the product name "Poly (dimethylsiloxane), vinyldimethylsiloxy terminated; viscosity 20 000 cSt.", order No. AB128873, CAS No. [68083-19-2] (ABCR catalog).

R5: Methylhydrosiloxane-dimethylsiloxane copolymer having a molecular weight of Mn=1900-2000 g/mol and a methylhydrogensiloxy content of 25-30 mol %, available from Gelest, Inc. (65933 Frankfurt am Main, Germany) under the product name HMS-301.

R6: Methylhydrosiloxane-dimethylsiloxane copolymer having a molecular weight of Mn=900-1200 g/mol and a methylhydrogensiloxy content of 50-55 mol %, available from Gelest, Inc. (65933 Frankfurt am Main, Germany) under the product name HMS-501.

R7: UV-activatable platinum catalyst: trimethyl(methylcyclopentadienyl)platinum(IV), available from Sigma-Aldrich®, Taufkirchen, Germany.

R8: SEMICOSIL® 988 1K, a thermally curable, translucent, sag-resistant, addition-crosslinking silicone rubber composition, having a dynamic viscosity of about 450 000 mPa·s (at 0.5 s$^{-1}$ and 25° C.) according to DIN EN ISO 3219 (available from WACKER CHEMIE AG, Munich, Germany).

R9: A hydrophobized fumed silica having a BET surface area of 300 m$^2$/g was prepared in analogy to patent specification DE 38 39 900 A1 by hydrophobization from a hydrophilic fumed silica Wacker HDK® T-30 (available from WACKER CHEMIE AG, Munich, Germany).

R10: SEMICOSIL® 914 UV-THIXO A+B, a transparent, thixotropic, two-component silicone rubber composition which crosslinks by addition with induction by UV light and has a mixed viscosity of about 42 000 mPa·s (at 0.5 s$^{-1}$ and 25° C.) according to DIN EN ISO 3219 and a Shore A vulcanizate hardness of 70 (available from WACKER CHEMIE AG, Munich, Germany).

R11: (3-Glycidoxypropyl)trimethoxysilane, 98%, available from ABCR GmbH, Karlsruhe, Germany, CAS No. [2530-83-8].

Example 1

Figure 2:
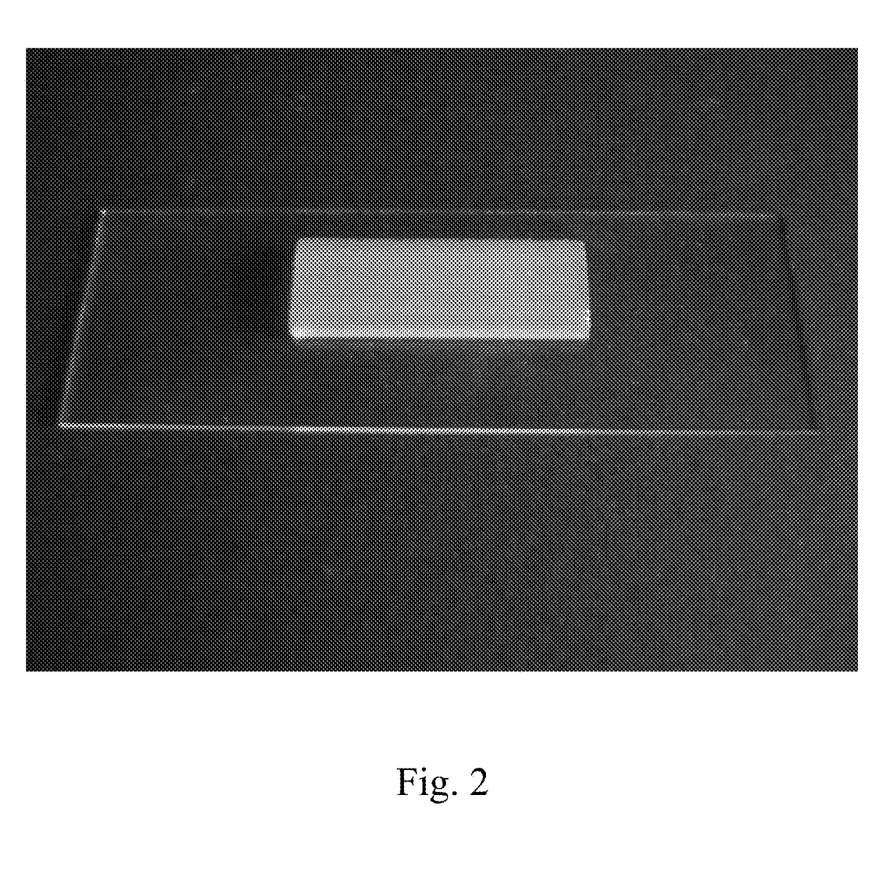
FIG. 2 illustrates a 3D article produced by the process of the invention.

R8 was deposited, using the jetting nozzle parameters indicated in table 1, on a glass slide (3) for an area of 25×75 mm, deposition taking place dropwise to form a layer measuring 10×30 mm. The high zero-shear viscosity and yield point of the silicone rubber composition permit sufficient dimensional stability of the layer deposited. The layer was subsequently crosslinked by IR radiation, by guiding the IR-Spot centrally over the length of the layer at the distance of 50 mm with an output setting of 40% for 1 minute. This procedure, meaning alternate jetting and crosslinking, was repeated until the cuboid body (8) had reached a height of 3 mm. The result was a transparent elastic shaped body (8) having dimensions of 10×30×3 mm, conforming to those according to FIG. 2.

Example 2

A silicone composition was prepared from
51 wt % R4
25 wt % R9
9 wt % R3
11 wt % R2
2.0 wt % R11
Subsequently, in the absence of light
R7, 30 ppm based on the platinum content of the whole mixture
2.4 wt % R6
were added and the resulting whole mixture was homogenized, devolatilized as described above, and dispensed into light-impervious 30 ml cartridges.

The silicone composition was repeatedly deposited dropwise (Voxel diameter: 0.5 mm) on a glass slide with an area 25×75 mm, using the jetting nozzle parameters indicated in table 1, to give a layer measuring 15×15 mm, and the deposited composition was irradiated continuously throughout the printing operation (50 sec) with the BLUEPOINT irradiation system with an output of 13,200 mW/cm$^2$. This gave transparent cuboid bodies (8) having dimensions of 15×15×3 mm.

Example 3

A silicone composition was prepared from
51 wt % R4
25 wt % R9
20 wt % R3
11 wt % R2
2 wt % R11
Subsequently, in the absence of light
R7, 30 ppm based on the platinum content of the whole mixture
2.9 wt % R5
were added and the resulting whole mixture was homogenized, devolatilized as described above, and dispensed into light-impervious 30 ml cartridges.

The silicone composition was repeatedly deposited dropwise (Voxel diameter: 0.5 mm) on a glass slide (3) with an area 25×75 mm, using the jetting nozzle parameters indicated in table 1, to give a layer measuring 11×11 mm, and the deposited composition was irradiated continuously throughout the printing operation (10 minutes) with the BLUEPOINT irradiation system with an output of 13,200 mW/cm$^2$. This gave transparent cuboid bodies (8) having dimensions of 11×11×8 mm.

Example 4

A silicone composition was prepared from
54 wt % R4
25 wt % R9
20 wt % R3
11 wt % R2
Subsequently, in the absence of light
R7, 30 ppm based on the platinum content of the whole mixture
1.8 wt % R6
were added and the resulting whole mixture was homogenized, devolatilized as described above, and dispensed into light-impervious 30 ml cartridges.

The silicone composition was repeatedly deposited dropwise (Voxel diameter: 0.9 mm) on a glass slide (3) with an area 25×75 mm, using the jetting nozzle parameters indicated in table 1, to give a layer measuring 11×11 mm, and the deposited composition was irradiated continuously throughout the printing operation (10 minutes) with the BLUEPOINT irradiation system with an output of 13,200 mW/cm$^2$. This gave transparent cuboid bodies (8) having dimensions of 11×11×8 mm.

Example 5

R10 was repeatedly deposited dropwise (Voxel diameter: 0.7 mm) on a glass slide (3) with an area 25×75 mm, using the jetting nozzle parameters indicated in table 1, to give a layer measuring 15×15 mm, and the deposited composition was irradiated continuously throughout the printing operation (50 sec) with the BLUEPOINT irradiation system with an output of 13,200 mW/cm$^2$. This gave cuboid bodies (8) having dimensions of 15×15×3 mm.

Example 6

A silicone composition was prepared from
27 wt % R1
40 wt % R4
14 wt % R3
1 wt % R11
The premix was mixed until R1 had dissolved and the composition was fully homogeneous and transparent.
Subsequently, in the absence of light
18 wt % R5
R7, 30 ppm based on the platinum content of the whole mixture were added and the resulting whole mixture was devolatilized as described above, and dispensed into light-impervious cartridges.

The silicone composition was repeatedly deposited dropwise (Voxel diameter: 1.5 mm) on a glass slide (3) with an area 25×75 mm, using the jetting nozzle parameters indicated in table 1, to give a layer measuring 15×15 mm, and the deposited composition was irradiated continuously throughout the printing operation (50 sec) with the BLUEPOINT irradiation system with an output of 13,200 mW/cm$^2$. This gave completely transparent cuboid bodies (8) having dimensions of 15×15×3 mm.

Example 7

A silicone composition was prepared from
45 wt % R1
38 wt % R4
9 wt % R3
The premix was mixed until R1 had dissolved and the composition was fully homogeneous and transparent.
Subsequently, in the absence of light
8 wt % R6
R7, 30 ppm based on the platinum content of the whole mixture
were added and the resulting whole mixture was devolatilized as described above, and dispensed into light-impervious cartridges.

The silicone composition was repeatedly deposited dropwise (Voxel diameter: 1.1 mm) on a glass slide (3) with an area 25×75 mm, using the jetting nozzle parameters indicated in table 1, to give a layer measuring 15×15 mm, and the deposited composition was irradiated continuously throughout the printing operation (50 sec) with the BLUEPOINT irradiation system with an output of 13,200 mW/cm$^2$. This gave completely transparent cuboid bodies (8) having dimensions of 15×15×3 mm.

Example 8

A silicone composition was prepared from
44 wt % R1
38 wt % R4
9 wt % R3
1 wt % R11
The premix was mixed until R1 had dissolved and the composition was fully homogeneous and transparent.
Subsequently, in the absence of light
8 wt % R6
R7, 30 ppm based on the platinum content of the whole mixture
were added and the resulting whole mixture was devolatilized as described above, and dispensed into light-impervious cartridges.

The silicone composition was repeatedly deposited dropwise (Voxel diameter: 1.0 mm) on a glass slide (3) with an area 25×75 mm, using the jetting nozzle parameters indicated in table 1, to give a layer measuring 15×15 mm, and the deposited composition was irradiated continuously throughout the printing operation (50 sec) with the BLUEPOINT irradiation system with an output of 13,200 mW/cm$^2$. This gave completely transparent cuboid bodies (8) having dimensions of 15×15×3 mm.

Example 9

A silicone composition was prepared from
39 wt % R1
44 wt % R3
2 wt % R11
The premix was mixed until R1 had dissolved and the composition was fully homogeneous and transparent.
Subsequently, in the absence of light
15 wt % R5
R7, 30 ppm based on the platinum content of the whole mixture
were added and the resulting whole mixture was devolatilized as described above, and dispensed into light-impervious cartridges in the absence of air.

The silicone composition was repeatedly deposited dropwise (Voxel diameter: 1.7 mm) on a glass slide (3) with an area 25×75 mm, using the jetting nozzle parameters indicated in table 1, to give a layer measuring 15×15 mm, and the deposited composition was irradiated continuously throughout the printing operation (50 sec) with the BLUEPOINT irradiation system with an output of 13,200 mW/cm$^2$. This gave completely transparent cuboid bodies (8) having dimensions of 15×15×3 mm.

Example 10

Example 8 with Undevolatilized Silicone Composition R8

Composition R8 was used and was not devolatilized under reduced pressure before being dispensed into the cartridge. R8 was deposited dropwise with the jetting nozzle parameters indicated in table 1 on a glass slide (3) with an area of 25×75 mm to form a noncrosslinked layer measuring 20×20 mm. This layer deposition was repeated until the cuboid body had attained a height of 12 mm. The high zero-shear viscosity and yield point of the silicone rubber composition permitted sufficient dimensional stability on the part of the noncrosslinked shaped body deposited.

The slide (3) with the noncrosslinked shaped body located on it was subsequently crosslinked thermally at 150° C. and atmospheric pressure for 30 minutes.

Figure 3:
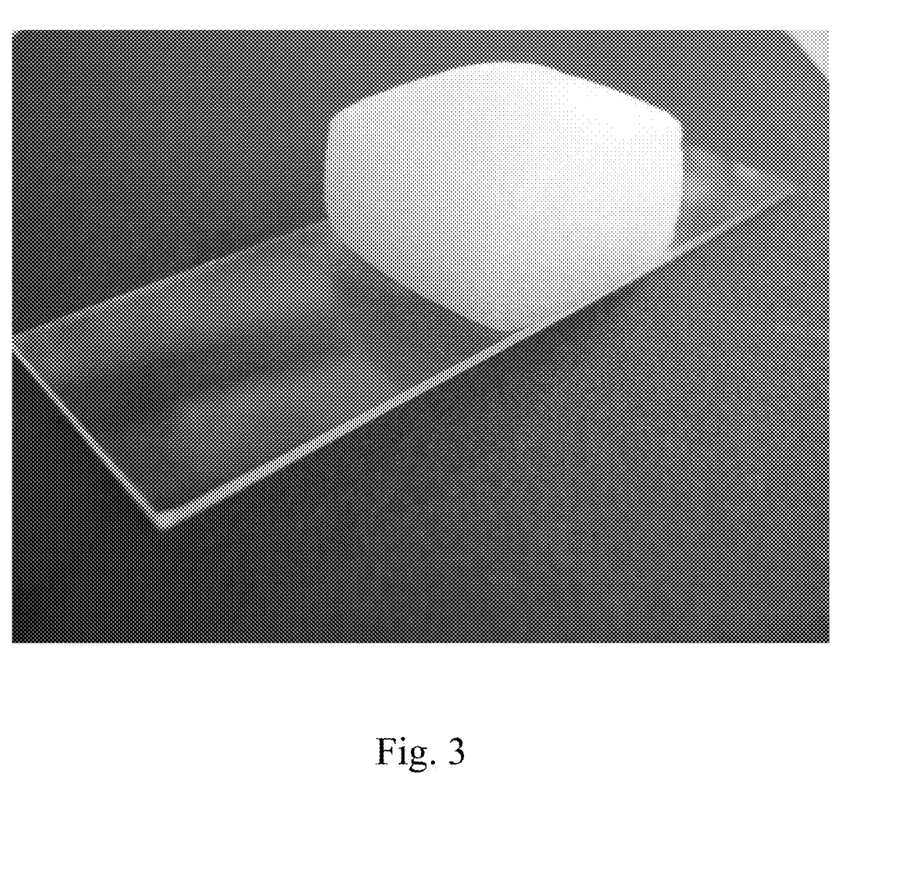
FIG. 3 illustrates a further 3D article produced by the inventive process.

The result was an opaque white, elastic shaped body (8) having dimensions of 20×20×12 mm (L×W×H), which was interspersed completely with small air bubbles, similar to a closed-cell elastomer foam body. The four sides and the top face were convex (see FIG. 3).

Example 11

Example 9 with Undevolatilized Composition from Example 2 Sem. 810 UV

Example 2 was repeated, with the sole difference that the composition was not devolatilized under reduced pressure before being dispensed into the cartridge.

The result was an opaque white elastic shaped body (8) having dimensions of 10×30×3 mm, which was interspersed fully with small air bubbles. The four sides and the top face were slightly convex and the shaped body (8) was interspersed with small bubbles.

Example 12

Production of a Three-dimensional "Wacker" Indicium with Silicone Composition from Example 2

A CAD file with a three-dimensional "Wacker" company indicium was used to produce an STL file (using "ProEngineer" software from PTC), from which a G-code was generated (by means of the "Slic3r" software). The "RepitierHost" software was used to deposit the silicone composition from example 2 dropwise, layer by layer, on the converted NEO printer, to give a three-dimensional "Wacker" company indicium.

The print substrate (8) used was a PTFE plate 2 mm thick with dimensions of 2 mm×150×150 mm.

Throughout the printing operation, the deposited composition was irradiated continuously using the BLUEPOINT irradiation system with an output of 13,200 mW/cm$^2$.

Figure 4:
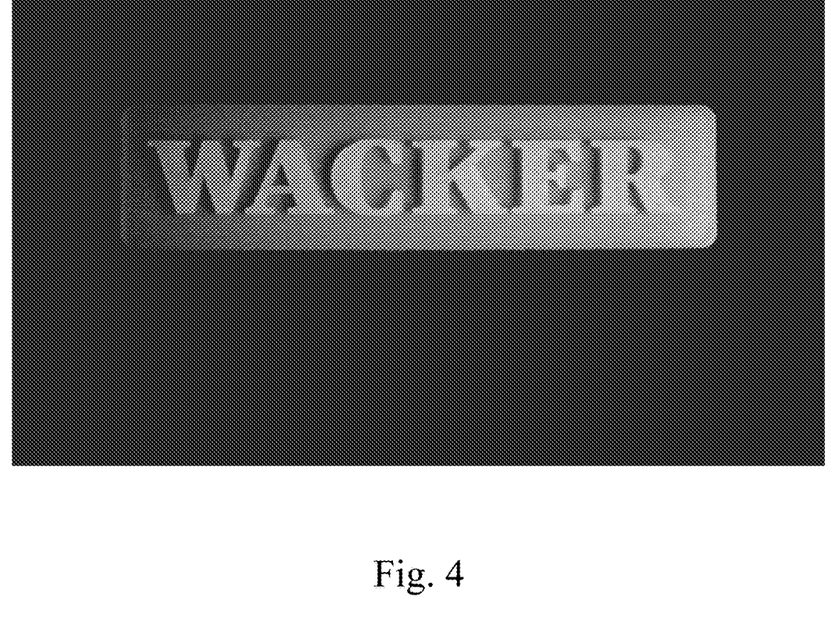
FIG. 4 illustrates yet a further 3D article produced by the inventive process.

Obtained in this way was a three-dimensional, crosslinked silicone elastomer body (8) having overall dimensions of 85 mm×25 mm×5 mm (length x width x overall height). The shaped body obtained can be seen in FIG. 4.

Example 13

3D Printing Under Reduced Pressure

Example 8 with the nondevolatilized silicone composition R8 was repeated analogously, except that the entire 3D printing operation on the noncrosslinked shaped body blank took place under reduced pressure at 130 mbar:

The converted fabricating unit of the invention as described above was additionally placed into a vacuum chamber. All power and media lines (compressed air line and cables) led from the printer to the outside while maintaining vacuum integrity; on the outside, there were the VERMES control unit, the PC, and the compressed air and power supplies. In this way, the fabricating unit of the invention could be started and operated from the outside, and the printing operation as well could be controlled completely from the outside. Within the vacuum chamber, the fabricating unit of the invention operated with the reduced pressure set.

The vacuum chamber used was a drum-shaped vacuum wood dryer from Eberl, Germany, with a diameter of 2 meters and a length of 3 meters, and was connected to a vacuum pump. The vacuum chamber internally was at room temperature of 23° C. When the vacuum chamber had been evacuated to a pressure of 130 mbar, with the fabricating unit of the invention located within it, the 3D printing operation was commenced.

The undevolatilized silicone composition R7 was deposited dropwise, with the jetting nozzle parameters indicated in table 1, on a glass slide (8) with an area of 25×75 mm, to form a layer measuring 11×11 mm×8 mm (L×W×H). The high zero-shear viscosity and yield point of the silicone rubber composition permits sufficient dimensional stability on the part of the layer deposited.

Thereafter the vacuum was broken, the dimensionally stable, noncrosslinked block was removed, and this block was crosslinked thermally in a drying oven at 150° C. for 30 minutes. The result was a bubble-free, fully transparent, elastic, cuboid body (8) with dimensions of 11×11×8 mm.

Example 14

3D Printing Under Reduced Pressure

Example 10 was repeated analogously, using an undevolatilized silicone composition with the constitution analogous to example 2.

The undevolatilized silicone composition was deposited dropwise, with the jetting nozzle parameters indicated in table 1, example 2, on a glass slide (3) with an area of 25×75 mm, to form a layer measuring 15×15 mm×3 mm (L×W×H). The high zero-shear viscosity and yield point of the silicone rubber composition permits sufficient dimensional stability on the part of the layer deposited.

Thereafter the dimensionally stable noncrosslinked block was irradiated for 10 seconds under UV light from the BLUEPOINT irradiation system. The result was a bubble-free, transparent, elastic, cuboid body (8) with dimensions of 15×15×3 mm.

TABLE 1

|  | Example | | | | |
| --- | --- | --- | --- | --- | --- |
|  | 1 | 2 | 3 | 4 | 5 |
| Nozzle diameter | 200 μm | 200 μm | 200 μm | 200 μm | 200 μm |
| Rising: | 0.30 ms | 0.30 ms | 0.30 ms | 0.30 ms | 0.30 ms |
| Falling: | 0.05 ms | 0.10 ms | 0.10 ms | 0.10 ms | 0.1 ms |
| Open time: | 3.0 ms | 15.0 ms | 15.0 ms | 15.0 ms | 10.0 ms |
| Needle lift: | 90% | 100% | 100% | 100% | 100% |
| Delay | 25 ms | 25 ms | 25 ms | 25 ms | 25 ms |
| Heating: | 45° C. | 50° C. | 50° C. | 45° C. | 45° C. |
| Cartridge admission pressure | 3.0 bar | 3.0 bar | 3.0 bar | 3.0 bar | 3.0 bar |
| Voxel diameter | 0.7 mm | 0.5 mm | 0.5 mm | 0.5 mm | 0.7 mm |

|  | Example | | | |
| --- | --- | --- | --- | --- |
|  | 6 | 7 | 8 | 9 |
| Nozzle diameter | 200 μm | 200 μm | 200 μm | 200 μm |
| Rising: | 0.30 ms | 0.30 ms | 0.30 ms | 0.30 ms |
| Falling: | 0.10 ms | 0.10 ms | 0.10 ms | 0.10 ms |
| Open time: | 15.0 ms | 15.0 ms | 15.0 ms | 15.0 ms |
| Needle lift: | 100% | 100% | 100% | 100% |
| Delay | 25 ms | 25 ms | 25 ms | 25 ms |
| Heating: | off | 40° C. | 40° C. | off |
| Cartridge admission pressure | 2.0 bar | 3.0 bar | 3.0 bar | 2.0 bar |
| Voxel diameter | 1.5 mm | 1.1 mm | 1.0 mm | 1.7 mm |

TABLE 2

| | Example | | | |
|---|---|---|---|---|
| | 1 | 2 | 3 | 4 |
| Viscosity in [mPas] at shear rate 0.5 s⁻¹ (measurement method page 10) | 450,000 | 433,000 | 627,000 | 130,000 |
| Viscosity in [mPas] at shear rate 25 s⁻¹ (measurement method page 10) | 30,000 | 47,000 | 53,100 | 42,600 |

| | Example | | | | |
|---|---|---|---|---|---|
| | 5 | 6 | 7 | 8 | 9 |
| Viscosity in [mPas] at shear rate 0.5 s⁻¹ (measurement method page 10) | 42,000 | 30,000 | 36,500 | 317,000 | 18,400 |
| Viscosity in [mPas]/shear rate (measurement method page 10) | 2600/ 100 s⁻¹ | 13,200/ 25 s⁻¹ | 36,000/ 10 s⁻¹ | 52,300/ 25 s⁻¹ | 5430/ 25 s⁻¹ |

The invention claimed is:

1. A process for the layer-by-layer production of shaped silicone elastomer parts, comprising the following steps:
   1) dropwise applying drops by an independently controllable jetting apparatus in an x, y work plane via at least one printing head, of at least one silicone rubber composition curable by electromagnetic radiation, to an independently spatially controllable baseplate or to a shaped body affixed thereto,
   2) crosslinking or incipiently crosslinking a drop or two or more drops by irradiating with at least one independently controllable source of electromagnetic radiation, to form a layer of a cured or partially cured shaped silicone elastomer part.
   3) displacing the jetting apparatus (1) or the shaped silicone elastomer part from step 2 relative to each other in the z-direction only far enough such that a next drop layer can be applied in the x, y work plane,
   4) repeating steps 1 to 3 until construction of the shaped silicone elastomer part is complete, wherein
      a) the curable silicone rubber composition is addition-crosslinkable and crosslinking in step 2 is induced by means of electromagnetic radiation either thermally and/or by UV or UV-VIS light,
      b) the silicone rubber composition has a viscosity of at least 10 Pa·s, measured at 25° C. and a shear rate of 0.5 s⁻¹, and is formulated as a one-component or multi-component system, and wherein when the addition-crosslinkable silicone rubber composition is a multicomponent system, the components are homogeneously mixed prior to applying by drops in step 1),
      c) the drops in the x, y work plane are exposed to the electromagnetic radiation site-selectively or areally, in pulses or continuously, and with constant or variable intensity, and
      d) steps 1) and 2) and 3) take place independently of one another, or are coupled to one another, simultaneously or in succession, in any order.

2. The process of claim 1, wherein the silicone rubber composition has a viscosity of at least 40 Pa·s, measured at 25° C. and a shear rate of 0.5 s–¹.

3. The process of claim 1, wherein the silicone rubber composition used has a viscosity of at least 100 Pa·s, measured at 25° C. and a shear rate of 0.5 s⁻¹.

4. The process of claim 1, wherein the silicone rubber composition has a viscosity of at least 200 Pa·s, measured at 25° C. and a shear rate of 0.5 s⁻¹.

5. The process of claim 1, wherein the electromagnetic radiation in step 2) is UV-VIS light of wavelength 240 to 500 nm.

6. The process of claim 1, wherein the electromagnetic radiation in step 2) is UV-VIS light of wavelength 250 to 400 nm.

7. The process of claim 1, wherein the electromagnetic radiation in step 2) is UV-VIS light of wavelength 250 to 350 nm.

8. The process of claim 1, wherein the curable silicone composition is a shear-thinning curable silicone composition containing a particulate filler.

9. The process of claim 2, wherein the curable silicone composition is a shear-thinning curable silicone composition containing a particulate filler.

10. The process of claim 3, wherein the curable silicone composition is a shear-thinning curable silicone composition containing a particulate filler.

11. The process of claim 4, wherein the curable silicone composition is a shear-thinning curable silicone composition containing a particulate filler.

12. The process of claim 1, wherein the silicone rubber composition has a viscosity of from 317 to 627 Pa·s, measured at 25° C. and a shear rate of 0.5 s⁻¹.

* * * * *